April 1, 1930. C. A. DUKE 1,752,734
COLLAPSIBLE SEAT OR BENCH
Filed April 4, 1928
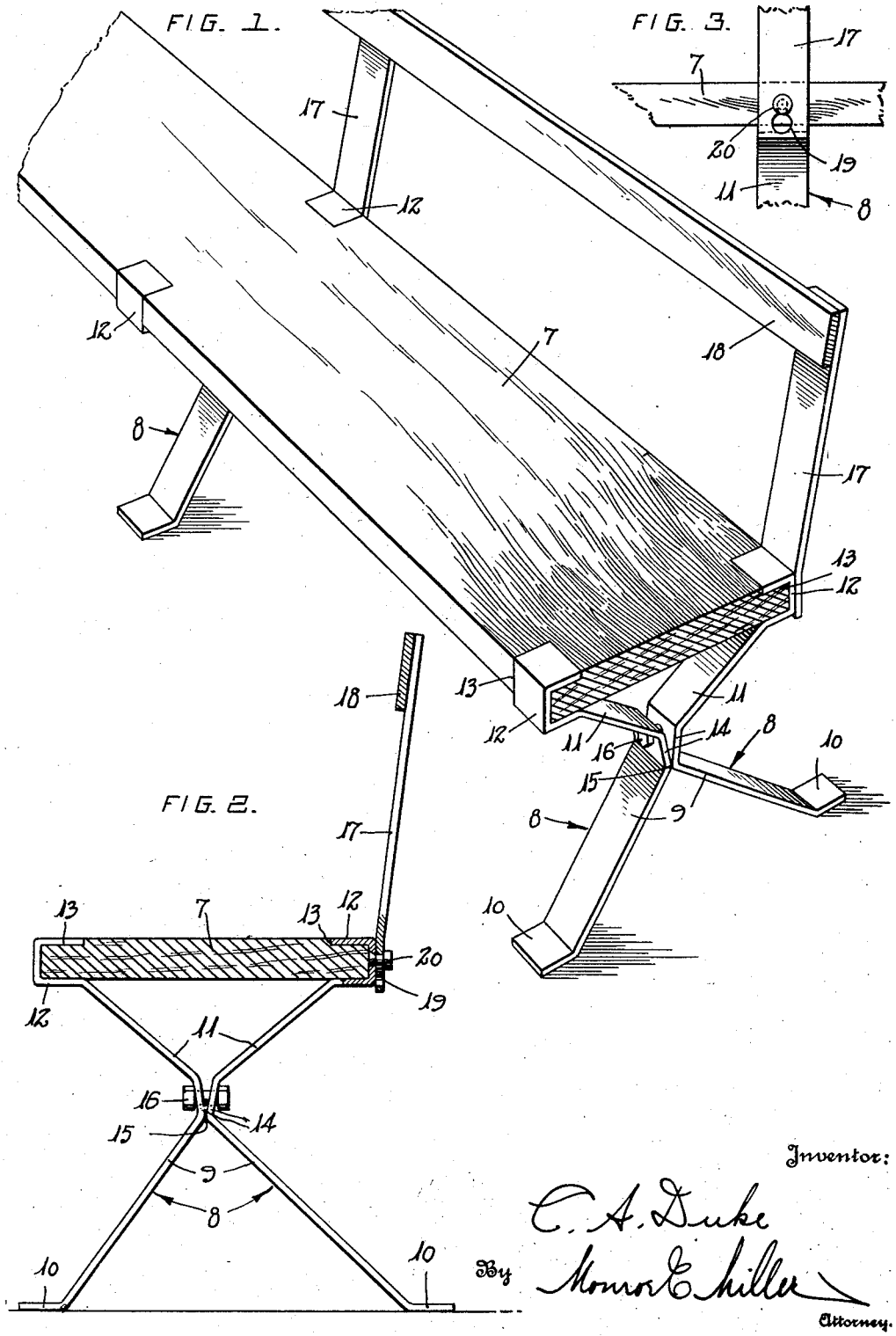
Inventor:
C. A. Duke
By Monroe E. Miller
Attorney.

Patented Apr. 1, 1930

1,752,734

UNITED STATES PATENT OFFICE

CHARLES ANDRE DUKE, OF NEW YORK, N. Y.

COLLAPSIBLE SEAT OR BENCH

Application filed April 4, 1928. Serial No. 267,306.

The present invention relates to seats and benches, and aims to provide a novel and improved portable and collapsible seat or bench structure, for use in arenas, auditoriums, and the like.

Another object of the invention is the provision of novel standards or supports for a seat board which may be readily applied to and removed from the board, to permit the parts to be stored or transported in knocked-down condition within minimum space.

A further object is the provision of a seat structure of the kind indicated embodying a removable back.

It is also an object of the invention to provide a seat construction of the kind indicated which comprises a novel assembly of the component parts, and which is simple, substantial and practical.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a fragmentary perspective view of a bench or seat embodying the improvements.

Fig. 2 is a cross-section thereof.

Fig. 3 is a fragmentary rear view to show the connection between the back and one of the standards.

A wooden board 7 provides the seat proper, and is supported at suitable intervals by standards each composed of a pair of bars or sections 8 which may be bent from suitable bars or strips of metal. The sections 8 of each standard have the downwardly diverging portions or legs 9 provided with the feet 10 to rest on the floor or supporting surface, and said sections have the upwardly diverging arms 11 formed at their opposite extremities with the hooks 12 to fit astride the front and rear edges of the board or seat 7.

If desired, the upper surface and edges of the board may be cut away, as at 13, to receive the hooks 12 flush with said upper surface and edges of the board.

The standard sections 8 have the intermediate portions 14 between the legs 9 and arms 11, providing the contact or fulcrum points 15 at the meeting ends of the legs 9, and the portions 14 diverge upwardly at a slight angle. A clamping bolt 16 extends through apertures in the portions 14, and when the bolt is tightened the portions 14 and arms 11 are forced toward one another, thereby clamping the board 7 tightly between the hooks or portions 12. This makes the seat structure thoroughly rigid, and by loosening the bolts 16 of the standards, the standards may be removed from the board 7, and the sections of the standards may also be separated, in order that the parts may be stored or shipped within minimum space.

The back comprises upwardly extending bars 17 having a horizontal rail or bar 18 welded or otherwise secured thereto. The lower terminals of the bars 17 have key-hole openings 19 to engage over headed studs 20 secured to and extending rearwardly from the rear hooks 12 of the standards. This permits the back to be readily applied to and removed from the seat standards. The bars 17 are preferably inclined rearwardly slightly, as seen in Fig. 2, and the rear legs 9 may extend rearwardly sufficiently to prevent the structure from tipping rearwardly when leaning against the back.

The standard sections 8, bars 17 and rail 18 may be readily made from bars or straps of suitable metal, and the construction is both simple and inexpensive. The parts may be quickly assembled and separated, and the parts will require minimum space for storage. The structure is rigid and substantial so as to avoid possibility of accidental collapsing thereof.

Having thus described the invention, what is claimed as new is:—

1. A seat standard comprising sections having hooks to engage the edges of a seat board, and means connecting said sections for moving them toward one another, said sections having fulcrum portions below said means adapted to contact with one another.

2. A seat standard comprising a pair of sections having downwardly diverging legs, upwardly diverging arms provided with hooks to engage the edges of a seat board, and portions between said legs and arms, a bolt extending through said portions, said portions contacting below said bolt and diverging upwardly.

3. A standard comprising a pair of members having feet to rest on a floor or other surface and having portions to engage the edges of a board, and means connecting said members between said feet and portions to move said members relatively to one another for clamping the board between said portions.

4. A standard comprising a pair of members having feet at their lower ends and having their upper ends formed with hooks to engage over the edges of a board, and means connecting said members between said feet and hooks to move said members relatively to one another for clamping the board between said hooks.

5. A standard comprising a pair of members having feet to rest on a floor or other surface and having portions to engage the edges of a board, said members having cooperable portions between said feet and firstnamed portions for the relative swinging motion of said members, and means connecting said members for swinging them relatively to one another for clamping the board between said portions.

6. A standard comprising a pair of members having feet to rest on a floor or other surface and having portions to engage the edges of a board, said members having contacting fulcrum portions between said feet and portions for the relative swinging movement of said members, and means connecting said members for swinging them relatively to one another for clamping the board between said portions.

7. A seat comprising a seat board, and standard supporting said board, each standard comprising a pair of members having feet to rest on a floor or other surface and having portions engaging the edges of said board, and means connecting said members between said feet and portions to move said members relatively to one another and clamp the board between said portions.

8. A seat comprising a seat board, and standards supporting said board, each standard comprising a pair of members having feet at their lower ends and having their upper ends formed with hooks engaging the edges of said board, and means connecting said members between said feet and hooks to move said members relatively to one another for clamping the board between said hooks.

9. A seat comprising a seat board, and standards supporting said board, each standard comprising a pair of members having feet to rest on a floor or other surface and having portions engaging the edges of said board, said members having cooperable portions between said feet and first named portions for the relative swinging movement of said members, and means connecting said members for swinging them relatively to one another to move said portions toward one another for clamping said board between them.

10. A seat comprising a seat board, and standards supporting said seat board, each standard comprising a pair of members having feet to rest on a floor or other surface and having portions engaging the edges of said board, said members having contacting fulcrum portions between said feet and first-named portions to permit said members to swing relatively to one another, and means connecting said members for swinging them to move said first-named portions toward one another to clamp the board between them.

In testimony whereof I hereunto affix my signature.

CHARLES ANDRE DUKE.